United States Patent [19]
Presti et al.

[11] Patent Number: 5,696,439
[45] Date of Patent: Dec. 9, 1997

[54] FUZZY CONTROL PROCESS FOR SWITCHING POWER SUPPLIES, AND DEVICE FOR PERFORMING IT

[75] Inventors: Matteo Lo Presti; Giuseppe D'Angelo, both of Misterbianco; Antonino Cucuccio, Catania, all of Italy

[73] Assignee: Consorzio per la Ricerca sulla Microelettronica nel Mezzogiorno, Catania, Italy

[21] Appl. No.: 497,726

[22] Filed: Jun. 30, 1995

[30] Foreign Application Priority Data

Jul. 1, 1994 [EP] European Pat. Off. ............ 94830328

[51] Int. Cl.$^6$ ............................................. G05F 1/40
[52] U.S. Cl. ..................... 323/283; 323/286; 323/287; 323/290; 323/222
[58] Field of Search .......................... 323/222, 283, 323/290, 241, 286, 287; 363/75

[56] References Cited

U.S. PATENT DOCUMENTS

| | | | |
|---|---|---|---|
| 4,940,929 | 7/1990 | Williams | 323/222 |
| 5,297,015 | 3/1994 | Miyazaki et al. | 363/146 |
| 5,349,523 | 9/1994 | Inou et al. | 363/97 |
| 5,493,485 | 2/1996 | Okado | 363/56 |

OTHER PUBLICATIONS

APEC '93, Mar. 7, 1993, San Diego, CA, USA pp. 22–28, Lin, "Analysis of Fuzzy Control Method Applied to DC–DC Converter Control".

Intelec '91, Nov. 5, 1991, Kyoto, Japan, pp. 261–267, Ueno, Oota & Sasaki, "Regulation of Cuk Converters Using Fuzzy Controllers".

*Primary Examiner*—Peter S. Wong
*Assistant Examiner*—Shawn Riley
*Attorney, Agent, or Firm*—Wolf, Greenfield & Sacks, P.C.; James H. Morris

[57] ABSTRACT

A process for the fuzzy control of switching power supplies which have at least one inductor and at least one switching device, and a device for performing this control, the particularity whereof resides in the fact that it comprises the following steps: measuring the value of the current on the inductor; measuring the value of the input voltage of the switching power supply; measuring an error generated between a reference voltage and an output voltage of the power supply; defining fuzzy membership functions for the value of the current on the inductor, for the input voltage value, and for the error; defining an output membership function for the value of the duty cycle of the power supply; defining multiple fuzzy inference rules to which the measured values and the membership functions are applied calculating the corresponding weight functions of the membership functions; defuzzifying the results obtained by means of the weight function calculation and the application of fuzzy rules so as to obtain a real value of the duty cycle which is suitable to drive the switching device.

136 Claims, 7 Drawing Sheets

FUZZY CONTROL PROCESS FOR SWITCHING POWER SUPPLIES, AND DEVICE FOR PERFORMING IT

BACKGROUND OF THE INVENTION

1. Field of the Invention

The present invention relates to a fuzzy control process for switching power supplies and to the device for performing it.

2. Discussion of the Related Art

As is known, all electronic devices require a DC voltage source. This voltage can be obtained from a battery or from a rectified alternating voltage which in most cases must be accurately filtered and stabilized.

Various types of voltage regulators are available for this purpose. Thus, for example, linear regulators have the advantage that they are structurally simple, easy to use, and have high-level characteristics. However, these regulators have the disadvantage that if there is a considerable difference between the input voltage and the stabilized output voltage, the power dissipated by the control transistor causes very low overall efficiency of the system.

A solution to this problem is provided by switching regulators (FIGS. 7, 8, and 9) in which an analog switch SW driven by a train of pulses controls the charging of two storage elements, the inductor L and the capacitor C, which can store energy and return it to the user $R_o$ in the appropriate amount.

Ideally, no component of the regulation network is dissipative. The value of the output voltage $V_o$ is regulated by means of a regulation loop in which part of the output voltage $v_o$ is compared with a reference $V_{ref}$ in order to drive a pulse modulator PWM. This modulator, by modifying the duty cycle of the train of pulses, sets the ratio between the open time and the closed time of the switch SW. In this manner, the charge and discharge processes of the storage elements L and C are controlled so as to produce an output voltage which is equal to the desired nominal value.

FIG. 7 illustrates a BUCK configuration of the switching power supply. The switch SW, connected to a first terminal of the input voltage, is arranged in series with respect to the inductor L and the load $R_o$, whereas the capacitor c is arranged in parallel to the load $R_o$. A diode D connects the second terminal of the input voltage to the node interposed between the inductor L and the switch SW. The output voltage $V_o$ is compared with a reference voltage $V_{ref}$ by means of a feedback loop (not show) in order to drive the modulator PWM which in turn controls the switch SW.

FIG. 8 instead shows a FLYBACK configuration of the switching power supply. This configuration is identical to the BUCK configuration, except that the diode D is replaced with the inductor L and vice versa.

FIG. 9 illustrates a BOOST configuration of the switching power supply, wherein the inductor L and the diode D are arranged in series with respect to the load $R_o$ and the switch SW connects the second input terminal to the node interposed between the inductor L and the diode D.

All three kinds of topology clearly use the same basic components: a power transistor used as switch SW, a diode D, an inductor L, and a filter element constituted by a capacitor C.

A common principle applied to all three topologies is related to the control method. In steady-state conditions, the voltage on the inductor L, averaged over a switching period, must be equal to zero. Otherwise, the average value of the current on the inductor L must change, violating steady-state conditions.

The three configurations, BUCK, FLYBACK and BOOST, have different input and output characteristics. Thus, for example, in the BUCK configuration (FIG. 7) the output voltage $V_o$ is always lower than the input voltage $V_i$ but has the same polarity. In the BOOST configuration (FIG. 9), the output voltage $V_o$ maintains the same polarity as the input voltage $V_i$ but always has a higher value. Finally, in the FLYBACK configuration the output voltage $V_o$ can be both higher and lower than the input voltage $V_i$ but always has the opposite polarity.

Three different control methods are generally considered: direct control of the duty cycle, voltage control, and current-mode control. These control techniques work with a constant switching period; the output voltage $V_o$ is compared with a fixed reference voltage, and the resulting error is amplified and fed back.

In duty cycle control, the on and off periods of the transistor are changed in proportion to the error. In this case, the filtering capacitor c is part of the closed-cycle system and thus introduces a phase delay that slows control with respect to rapid changes in the input voltage $V_i$.

In the direct voltage control method, a sample of the input voltage $V_i$ is passed directly to the control circuit, which produces a variation in the duty cycle that is inversely proportional to the variations in the input voltage $V_i$, which is directly proportional to the error.

In current-mode control, a second feedback loop (not show) is introduced; this loop compares the current on the inductor with the error. In this manner it is possible to obtain direct control of the current on the inductor L.

The last two control methods are generally used. Both (voltage control and current-mode control) have the same advantages, since they both improve the open-loop regulation line, provide instantaneous correction of mains variations, and require a low closed-loop gain.

However, these control methods have drawbacks. In particular, current-mode control is unable to eliminate the zero with positive real part that is present in the BOOST topology (FIG. 9) and in the FLYBACK topology (FIG. 8) in continuous operation. Accordingly, these topologies are not very stable and their use is therefore limited on an industrial level although they are more flexible than other topologies.

Furthermore, in order to achieve efficient regulation of the power supply it is necessary to provide a robust controller which can simultaneously handle different kinds of information (input voltage, current on the inductor, voltage on the output).

In addition to this, in the case of power devices additional characteristics are necessary (various protections, monitoring of the power transistor, control of the parameters of the transistor in order to optimize energy consumption, etc.) and usually require additional circuitry which is not always easy and cheap to provide.

Another critical point for the control of these devices is the dependency of the control criterion on the variations of the parameters of the system. The performance of the device thus deteriorates due to parametric variations of the system. In particular, the control systems of the power transistor depend heavily on the parameters of the transistor, which are typically difficult to identify and control.

SUMMARY OF THE INVENTION

Accordingly, the aim of the present invention is to provide a fuzzy control process for switching power supplies which improves, with respect to known control techniques, the performance of said power supplies, providing a control that is insensitive to parametric variations.

Within the scope of this aim, an object of the present invention is to provide a fuzzy control process that is insensitive to external noise.

Another object of the present invention is to provide a process that can control the switching power supply both in terms of performance and in terms of monitoring and controlling all the components of the system.

Another object of the present invention is to provide a robust switching power supply controller that can simultaneously handle information of different kinds (input voltage, current on the inductor, voltage on the output).

Another object of the present invention is to provide a process that can control said switching power supplies in a stable manner.

Another object of the present invention is to provide a process which is faster than conventional control methods.

Another object of the present invention is to provide a process, and the device for its execution, which are highly reliable, and relatively easy and inexpensive to manufacture.

This aim, these objects and others which will become apparent hereinafter are achieved by a process for the fuzzy control of switching power supplies which have at least one inductor and at least one switching device, which process comprises the following steps: measuring the value of the current on the inductor; measuring the value of the input voltage of the switching power supply; measuring an error generated between a reference voltage and an output voltage of the power supply; defining fuzzy membership functions for the value of the current on the inductor, for the input voltage value, and for the error; defining an output membership function for the value of the duty cycle of the power supply; defining multiple fuzzy inference rules to which the measured values and the membership functions are applied; calculating the corresponding weight functions of the membership functions; defuzzifying the results obtained by means of the weight function calculation and the application of fuzzy rules so as to obtain a real value of the duty cycle which is suitable to drive the switching device.

BRIEF DESCRIPTION OF THE DRAWINGS

Further characteristics and advantages of the invention will become apparent from the description of a preferred but not exclusive embodiment, illustrated only by way of non-limitative example in the accompanying drawings, wherein.

DETAILED DESCRIPTION

Figure 1:
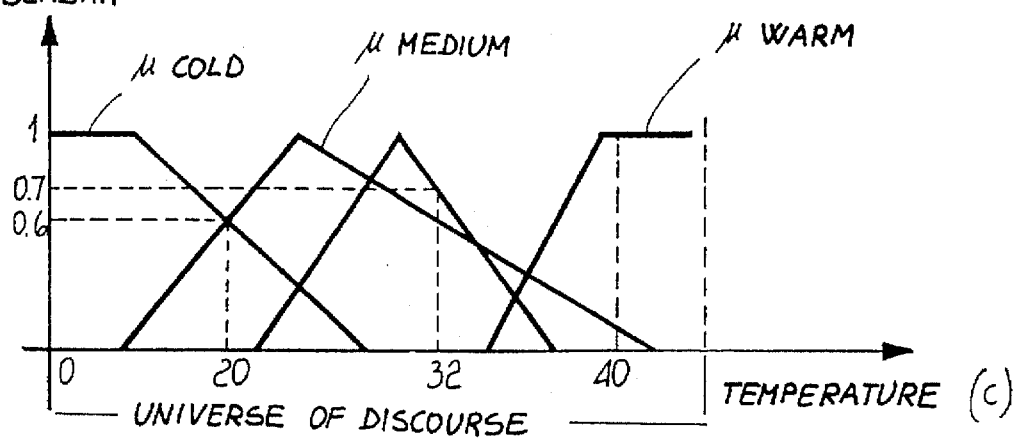
FIG. 1 is an example of a fuzzy set and of degrees of membership functions.

In order to better explain the inventive concept of the present invention it is necessary to make an introductory premise on fuzzy-logic control technique, which is used in the process and in the device according to the present invention.

Fuzzy logic, differently from systems based on classical logic, attempts to model the reasoning methods that are typical of the human mind, allowing to make rational decisions in uncertain and inaccurate environments.

Fuzzy logic offers a set of rules which can cope with non-exact facts expressed by means of the semantics of a linguistic method.

The basic concepts of fuzzy logic are linguistic variables and fuzzy sets, the latter being characterized by membership functions.

Fuzzy logic allows one to work with linguistic descriptions of reality; this means that a problem is not characterized exactly (like a mathematical model) but is given as a linguistic representation of the algorithms. A particular class of variables, known as linguistic variables, is used to represent the information that becomes available during the linguistic description step. Linguistic variables are characterized by the type of values that can be assigned to them: this kind of word includes words or sentences in any natural or artificial language.

Accordingly, linguistic variables contain the semantic meaning of the sentences used in modeling the problem. Syntactically speaking, a set of values that depends on the selected variable can be found for each linguistic variable. This set can assume different meanings according to the context in which it is used.

For each linguistic variable it is possible to provide a table that summarizes all the values that this variable can assume. These values can generally be obtained by applying appropriate modifiers to a primary term, which represents the variable, or to its opposite. The following table gives an idea of this.

| Linguistic variable | name: TEMPERATURE |
| --- | --- |
| Primary term | COLD |
| Opposite | WARM |
| Modifiers | NOT, VERY, MORE, or LESS |

Fuzzy sets and the associated membership functions are closely linked to the above mentioned linguistic variables. Each value assigned to a linguistic variable is in fact represented by a fuzzy set.

A fuzzy set can be considered as a distribution of possibilities that links a particular value of a linguistic variable to a definition domain (the universe of discourse). If a fuzzy set is plotted on a chart, the degrees of membership (or truths) are plotted on the axis of ordinates, whereas the universe of discourse, i.e. the definition domain of the fuzzy variable (in this case, the temperature and the related fuzzy set), is plotted on the axis of abscissae.

This domain can be a continuous space {x} or a discretized representation {x1 ... x2}. For example, if X is a temperature, {x} represents its range of variability, whereas {x1 ... x2} represents the discrete values that characterize it.

Membership functions µ(x) are functions that identify a fuzzy set in the universe of discourse that is characteristic of a linguistic variable and associate a degree of membership of a given value to the fuzzy set for each point of the definition domain (universe of discourse), accordingly mapping the universe of discourse in the range [0,1].

A membership value µ(x)=0 indicates that point x is not a member of the fuzzy set being considered, which is identified by the function µ, whereas a value µ(x)=1 indicates that the value x is certainly a member of the fuzzy set.

Membership functions are entities on which fuzzy computation is performed; this computation is performed by means of appropriate operations on the sets represented by the membership functions.

Figure 2:
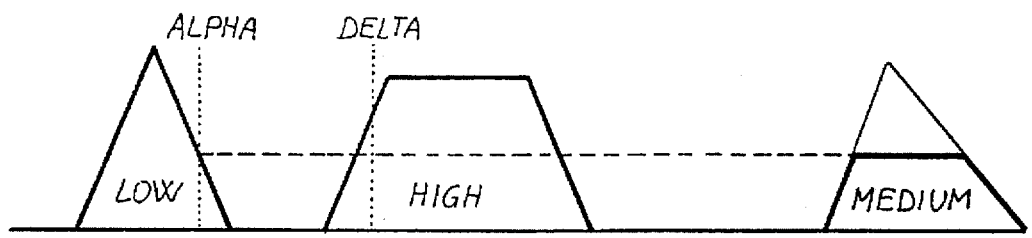
FIG. 2 is an example of a MAX/MIN fuzzy inference.

The collection of all the fuzzy sets of a linguistic variable is known as a "term set" FIG. 2 summarizes the definitions given earlier. FIG. 2, for the sake of graphic simplicity, plots triangular membership functions $\mu_{cold}, \mu_{medium}$ and $\mu_{warm}$ which can generally be represented by any linear or non-linear function.

The adoption of a particular computational model is one of the factors that affects the performance of the device. However, the fuzzy control process for switching power supplies according to the present invention can be implemented with any fuzzy computational model.

Examples of these computational models will be described hereinafter.

At the high level, a fuzzy program is a set of rules of the IF-THEN type. The following example shows a set of three rules with two inputs (A and B) and two outputs (C and D). The various terms A1, A2 ... D3 represent the knowledge of the system, obtained from expert technicians or in other ways, in the form of membership functions:

rule 1: IF [(A is A1)] AND (B is B1)] THEN [(C1 is $C_1$) AND (D1 is $D_1$)]

rule 2: IF [(A is A2)] AND (B is B2)] THEN [(C2 is $C_2$) AND (D2 is $D_2$)]

rule 3: IF [(A is A3)] AND (B is B3)] THEN [(C3 is $C_3$) AND (D3 is $D_3$)]

The part of each rule that precedes THEN is commonly termed "left part" or "antecedent", whereas the part that follows THEN is termed "consequent" or "right part".

The inputs A and B, after being appropriately fuzzified, i.e. converted into membership functions, are sent to the rules to be compared with the premises stored in the memory of the control device (the IF parts). Multiple rules are combined simply by means of a fuzzy union operation on the membership functions that are the result of each rule.

Conceptually, the better the equalization of the inputs with the membership function of a stored rule, the higher is the influence of said this in overall computation.

In order to determine this equalization, weight functions which identify some particularly indicative values are determined. One of these weight functions is the function α, which indicates the extent to which the input propositions (A1, B1) match the stored premises (A, B). In the above example of rules, the function α is given as:

$$\alpha_i A = \max(\min(A1, A_i))$$

$$\alpha_i B = \max(\min(B1, B_i))$$

for i=1, 2, 3 (number of rules).

The second weight function is $\Omega_i$, which indicates the extent of the "general resemblance" of the IF part of a rule. For the above example, the function $\Omega_i$ is calculated as:

$$\Omega_i = \min(\alpha_i A, \alpha_i B, \ldots)$$

for i equal to the number of rules and with as many items inside the parenthesis as there are propositions (the IF part) of each rule. As an alternative to the above membership function, a weight function equal to the product of the individual membership values is usually used:

$$\Omega_i = \alpha_i A \times \alpha_i B$$

These values, which in practice define the activation value of the antecedent part of the fuzzy inference, are used subsequently to calculate the activation value of the consequent (i.e. the right part).

As far as this subject is concerned, two different inference methods are generally considered: MAX/DOT and MAX/MIN. Essentially, both methods act by modifying the membership functions of the consequent by means of a threshold value which is supplied by the antecedent.

Figure 3:
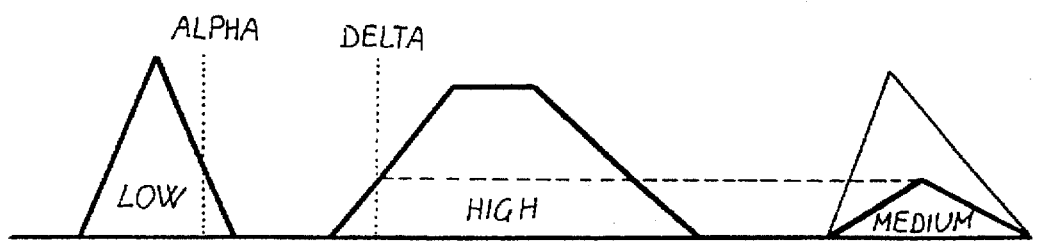
FIG. 3 is an example of a MAX/DOT fuzzy inference.

The MAX/MIN method acts by clipping the membership functions related to the consequent in the manner shown in FIG. 3. The rule of the fuzzy inference of FIG. 3 is as follows:

IF alpha IS low AND delta IS high THEN gamma IS medium

As regards the values "alpha" and "delta" in input, one uses the related lower (threshold) membership value with which the membership function of the output "gamma" is clipped. In practice, the membership function in output will have no value higher than the threshold value.

Figure 4:
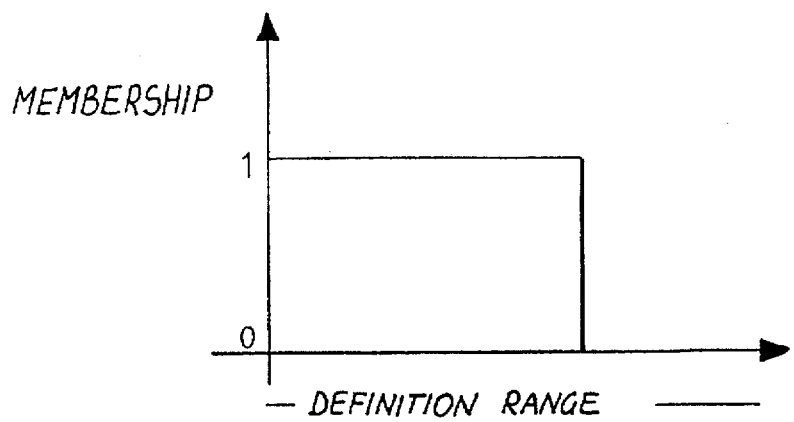
FIG. 4 is an example of a crisp-type membership function.

The MAX/DOT method instead acts by modifying the membership functions of the right part (the consequent), so that the membership function of the output is "compressed", while however trying to maintain its original shape as much as possible. The MAX/DOT method for the same rule as above is shown in FIG. 4.

In the case of fuzzy control it is possible to simplify the calculation of the weights α. It is in fact possible to considerably reduce the amount of calculation by assuming that one is dealing with a degenerate case of fuzzy calculus in which the input variables are not fuzzy sets (ambiguous values) but are variables which generally originate from sensors and are thus definite numeric values. The input data are not fuzzy sets but crisp values.

Figure 5:
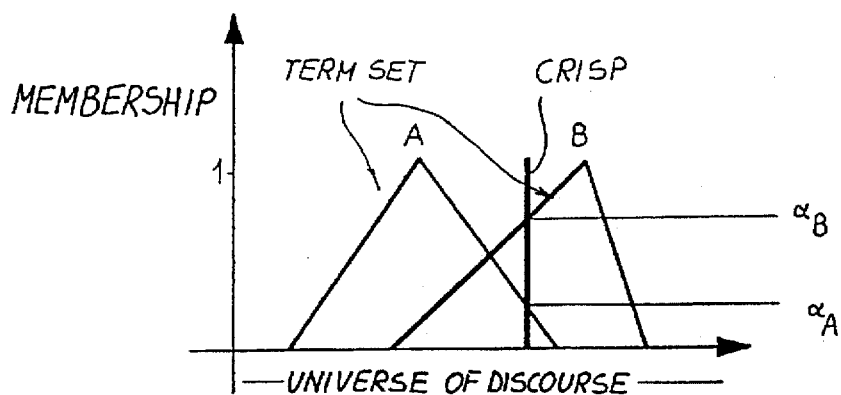
FIG. 5 is an example of fuzzy calculation with crisp values.

In order to represent these values within a fuzzy system, they must be converted into crisp membership functions, i.e. into particular membership functions which have an activation value of 1 ("TRUE") at the point which corresponds to the value provided in input. Equally, these crisp values have a zero ("FALSE") value in the remaining part of the definition range. This concept is shown in FIG. 5.

In order to convert a physical value, provided for example by an external sensor, into a fuzzy value, it is thus sufficient to assign the maximum truth value that is characteristic of the system to the point of the definition range that is identified by the measured value. With reference to computation, this means that the case shown in FIG. 6 always occurs.

Figure 6:
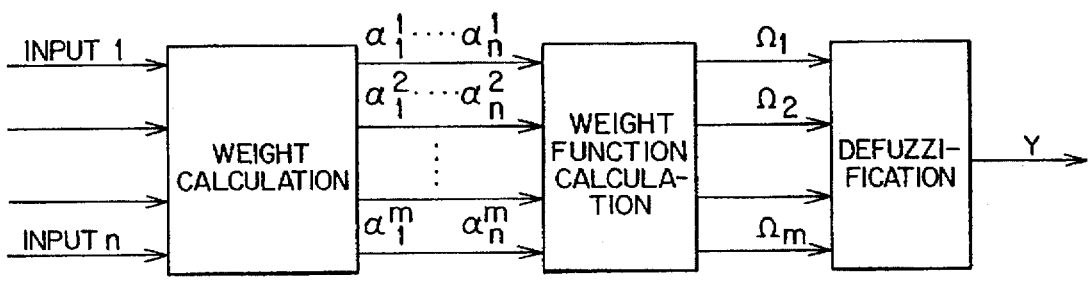
FIG. 6 is an example of a fuzzy computational model.

Calculation of the weights α in the particular case of FIG. 6, where there are crisp values such as occur in the case of machines that control physical values, becomes merely a matter of finding the intersection $\alpha_B$ and $\alpha_A$ of the input variables with the membership functions imposed by the term sets A and B.

The weights thus calculated are then used for computation on the consequent of the fuzzy inference (i.e. on the fuzzy rules).

It should be noted that for control systems as in the case of the present invention, the output of the fuzzy regulator must be a definite physical value of the control criterion. Generally, once the inference has been performed on the right part of the fuzzy rules, one obtains a fuzzy set; it is accordingly necessary to defuzzify, i.e. to extract a definite numeric value from the calculated fuzzy set. There are various defuzzification methods, such as for example the centroid method, the maximum height method, etc. In practice, for reasons related to numeric precision the most widely used method is the centroid method, according to which:

$$y = \frac{\sum_{i=1}^{n} \Omega_i \cdot C_i}{\sum_{1}^{n} \Omega_i}$$

where n is the number of rules and C represents the centroids (centers of gravity) of the membership functions of the consequents of each rule, appropriately modified by using the MAX/MIN or MAX/DOT method. The functions $\Omega$ are determined as described earlier, using either the minimum among the functions $\alpha$ or the product thereof. This computational model is referenced as the MAMDANI computational model. As an alternative, it is also possible to use another alternative fuzzy computational model, referenced as SUGENO model, in which defuzzification is performed simply by means of the following rule:

$$y = \sum_{i=1}^{n} \Omega_i \cdot \alpha_i$$

In the above equation, $\Omega_0$ is always equal to 1. In practice, the defuzzified value is determined by a linear combination of the activation values of each individual rule.

Figure 7:
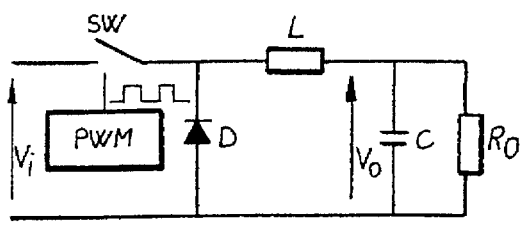
FIG. 7 is an electric diagram of a known switching power supply of the BUCK type.

With reference to FIG. 7, in the case of a fuzzy controller, the input values are numeric values (input 1–n) which originate from sensors. In this case it is necessary to fuzzify these values to obtain fuzzy values $\alpha$, apply the fuzzy inference (the rules) to obtain the weight functions $\Omega$ of these fuzzy values, and finally defuzzify these weight functions $\Omega$ so as to obtain a definite numeric value y in output.

This fuzzy control method is applied to the switching power supplies according to the present invention.

Figure 8:
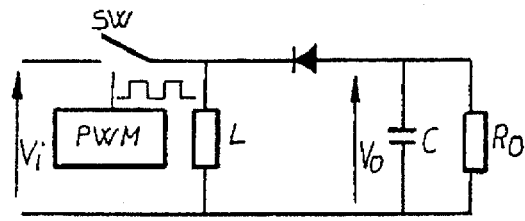
FIG. 8 is an electric diagram of a known switching power supply of the FLYBACK type.
Figure 9:
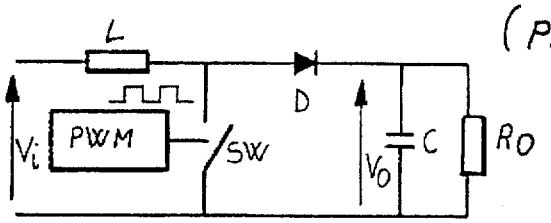
FIG. 9 is an electric diagram of a known switching power supply of the BOOST type.

The FLYBACK configuration (FIG. 8) of the switching power supply is considered as an example of the application of the present invention, although the present invention can be applied to any one of the known configurations (BUCK, BOOST, FLYBACK).

During the on period $T_{on}$ of the switch SW, which is constituted by a power transistor, the variation of the current on the inductor L is given by the equation:

$$\frac{dI_L}{dt} = \frac{1}{L}(V_i - R_L I_L)$$

whereas the variation of the voltage applied across the output capacitor C is given by the equation:

$$\frac{dV_c}{dt} = \frac{1}{C}\left(\frac{V_C}{R_C + R_O}\right)$$

During the off periods $T_{off}$ of the switch SW, variation of the current on the inductor L yields the following:

$$\frac{dI_L}{dt} = -\frac{1}{L}\left(R_L + \frac{R_C R_O}{R_C + R_O}\right)I_L + \frac{1}{L}\left(\frac{R_O}{R_O + R_C}\right)V_C$$

whereas variation of the voltage on the capacitor C yields the following:

$$\frac{dV_C}{dt} = -\frac{1}{C}\left(\frac{R_O}{R_C + R_O}\right)I_L - \frac{1}{C}\left(\frac{1}{R_O + R_C}\right)V_C$$

This non-linear model of the FLYBACK power supply is given by two groups of equations defined by the state (on/off) of the power transistor SW.

In order to develop the fuzzy controller that is suitable to drive the power supply, the current on the inductor $I_L$, the output voltage $V_o$, and the error produced by the comparison between the input voltage $V_i$ and a reference voltage $V_{ref}$ have been considered.

Figure 10:
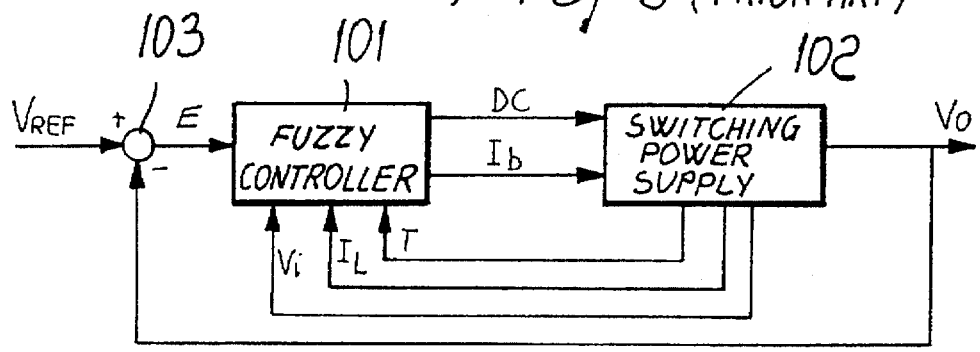
FIG. 10 is the block diagram of the control device according to the present invention.

The model of the control system, which can be applied to all three configurations of the switching power supply, is given by FIG. 10, where a fuzzy controller 101 is connected to the switching power supply 102. The fuzzy controller 101 receives in input the input voltage $V_i$, the current on the inductor $I_L$, and the error E generated by the adder node 103, which error can be obtained by subtracting the output voltage $V_o$ from the reference voltage $V_{ref}$. The input voltage $V_i$ and the current on the inductor $I_L$ are measured by appropriate measurement means.

The temperature T of the power transistor SW is also sent to the fuzzy controller 101. This temperature is measured by temperature measurements means.

In this manner it is possible to perform direct control of the switching on and off of the power transistor SW and of the temperature itself. By optimizing these parameters it is possible not only to limit losses during the switching of the transistor SW but also to obtain better performance when working at a very high switching frequency, since it is possible to reduce the switching delays of the transistor SW.

The outputs of the fuzzy controller 101 are the duty cycle DC of the power supply and the base current (or gate voltage) $I_b$ of the power transistor SW.

Figure 11:
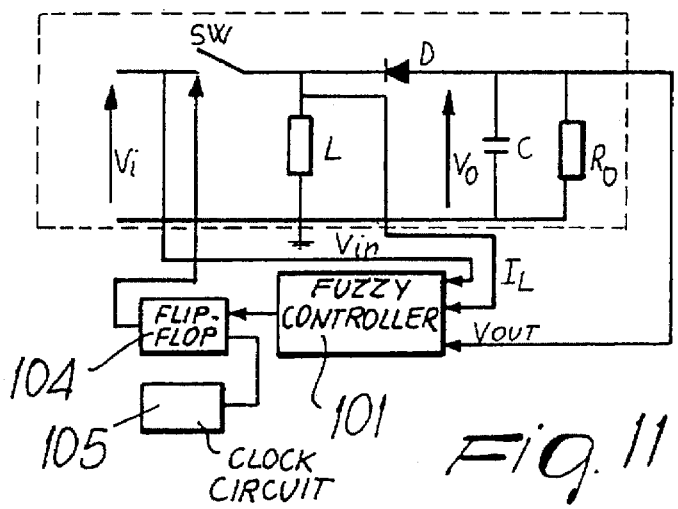
FIG. 11 is the block diagram of a switching power supply controlled with the process according to the present invention.

FIG. 11 instead illustrates the application of the fuzzy controller 101 to a power supply of the FLYBACK type. The current $I_L$ is measured on the line of the inductor L by appropriate current measurement means. The input voltage $V_i$ is measured from the input terminals of the power supply by voltage measurement means. The output of the fuzzy controller 101 is sent to the SET input of a flip-flop 104, whereas a clock signal originating from a clock circuit 105 is applied to the RESET input. The output of the flip-flop circuit 104 is instead suitable to drive the transistor/switch SW.

FIG. 11 does not show all the parasitic elements of the reactive components for the sake of better graphic clarity. These elements, as well as the delays in the switching of the power transistor, have been considered during the simulation of the device.

By using the device according to the present invention, corrections are made to the control criterion according to the variations of the fundamental parameters of the control system, obtaining a control criterion that is robust and capable of controlling the system with a high performance.

For the control system shown in FIG. 10, the form of the fuzzy rules is given by:

IF current IS ... AND $V_i$ IS ... AND E IS ... AND T IS ... THEN DC IS ... AND $I_b$ IS These fuzzy rules are processed by fuzzy inference means of the fuzzy controller 101.

Membership functions for each one of the linguistic variables have been developed from the above mentioned characteristic equations of the power supply.

The typical form of the developed rules is:

IF current IS medium AND $V_i$ IS small AND E IS zero THEN DC IS duty AND $I_b$ IS medium The fuzzy values of the linguistic variables have been developed from knowledge available on the typical equations of the power supply or from the experience of expert technicians.

In this particular case, the fuzzy controller 101 has been devised to regulate the output voltage $V_o$ at 12 V with input voltages that can vary between 5 and 24 V ($5<V_i<24$).

Figure 12A:
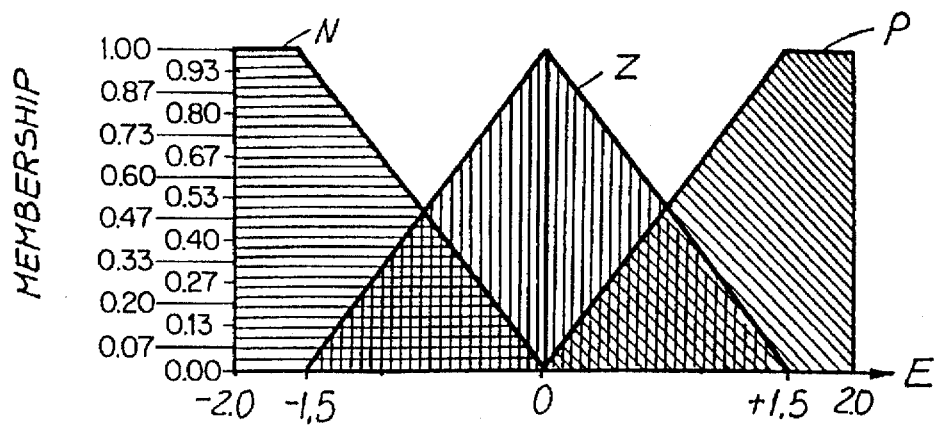
FIG. 12a plots the fuzzy sets and the membership degrees of the error between the reference voltage $V_{ref}$ and the output voltage $V_o$.

FIG. 12a plots the three membership functions developed for the variable E, i.e. the error generated between the output voltage $V_o$ and the reference voltage $V_{ref}$. There are three membership functions: a first N(egative) one, a second Z(ero) one, and a third P(ositive) one.

Figure 12B:
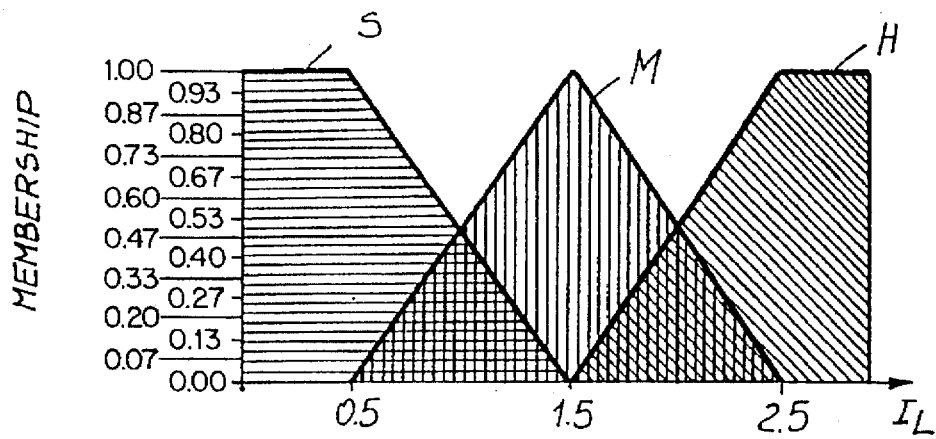
FIG. 12b plots the fuzzy sets and the membership degrees of the current on the inductor L.

FIG. 12b instead plots the three membership functions S(mall), M(edium) and H(igh) developed for the current on the inductor $I_L$.

Figure 12C:
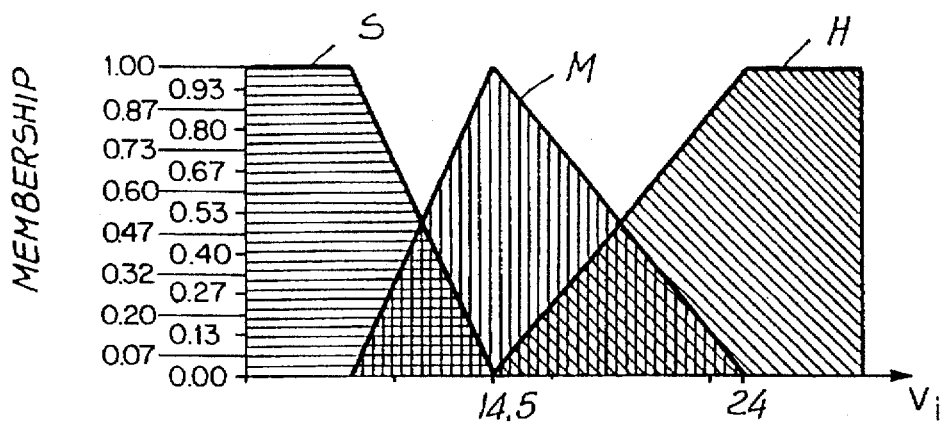
FIG. 12c plots the fuzzy sets and the membership degrees of the input voltage $V_i$.

FIG. 12c plots the membership functions S(mall), M(edium) and H(igh) developed for the input voltage $V_i$.

In a similar manner, it is possible to also develop membership functions for the temperature T of the power transistor SW.

The membership functions are developed by means for defining the membership functions of the fuzzy controller 101.

For the sake of simplicity, the temperature T has been assumed constant in developing the membership functions of FIGS. 12a–c. As can be seen, only three membership functions for each linguistic variable have been used. Considering all the possible combinations of the membership functions of each individual linguistic variable, twenty-seven rules have been determined, and their consequents represent the value of the duty cycle DC to be applied and, optionally, also the value of the base current (or gate voltage) of the power transistor SW.

Defuzzification occurs by virtue of defuzzification means of the fuzzy controller 101.

During defuzzification, assuming that the membership functions for the consequents are triangular and symmetrical, the values of the respective centroids are independent of the activation value of the antecedents. Accordingly, it is possible to consider the consequents with constant values of the centroids $C_i$. The defuzzification rule in this case assumes the following form:

$$y = \frac{\sum_{i=1}^{27} \Omega_i \cdot C_i}{\sum_{1}^{27} \Omega_i}$$

In the above formula, the $\Omega$ values represent the degrees of activation of each rule; these are typically calculated by considering the minimum among the activation values of the membership functions of the linguistic variables of the antecedents; with reference to the above formalism, one obtains:

$$\Omega = \min(\alpha I_L, \alpha V_i, \alpha E)$$

These weight values are calculated by weight calculation means of the fuzzy controller 101.

Excellent results are also obtained when the product of the previous values is considered instead of their minimum.

Defuzzified, i.e. crisp, values have been obtained for each one of the twenty-seven rules.

Figure 13A:
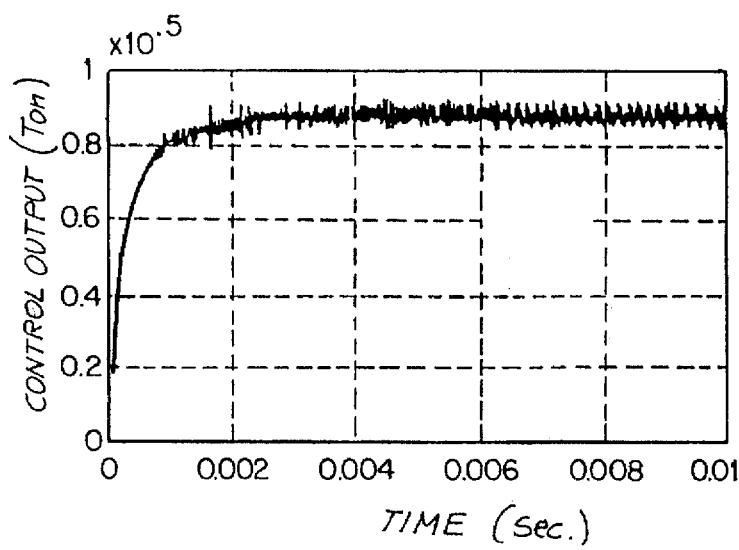
FIGS. 13a–13f plot characteristic curves obtained with the process according to the present invention.

FIGS. 13a–f illustrate some of the results obtained. In particular, FIG. 13a plots the variation of the state $T_{on}$ (switch SW closed).

Figure 13B:
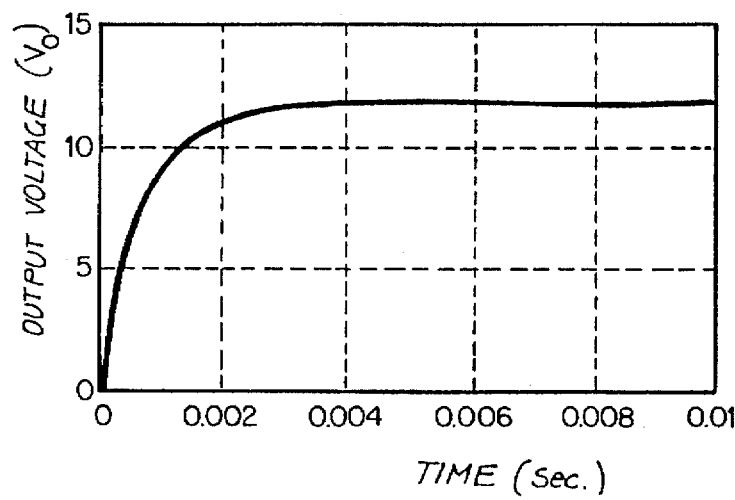

FIG. 13b plots the variation of the output voltage $V_o$.

Figure 13C:
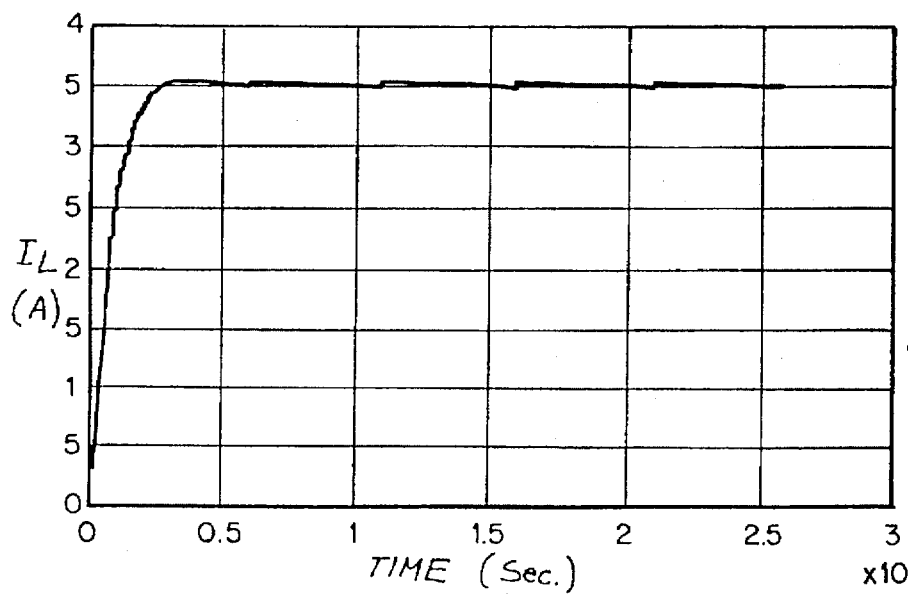

FIG. 13c plots the variation of the current $I_L$ in short-circuit conditions.

Figure 13D:
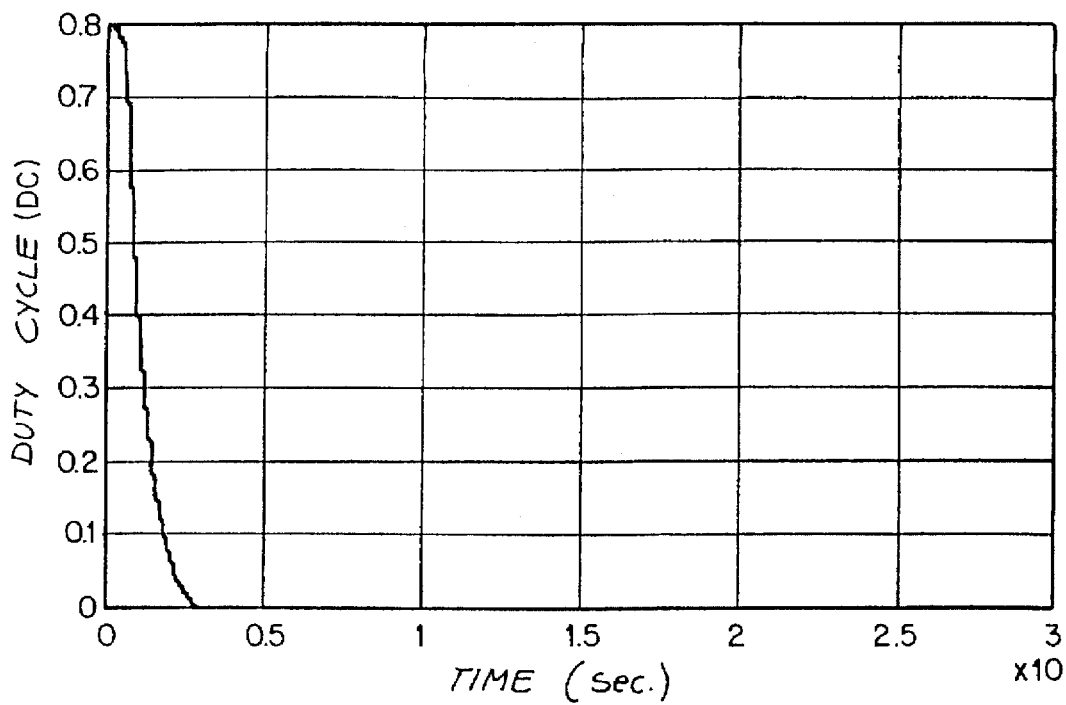

FIG. 13d plots the variation of the duty cycle DC in short-circuit conditions.

Figure 13E:
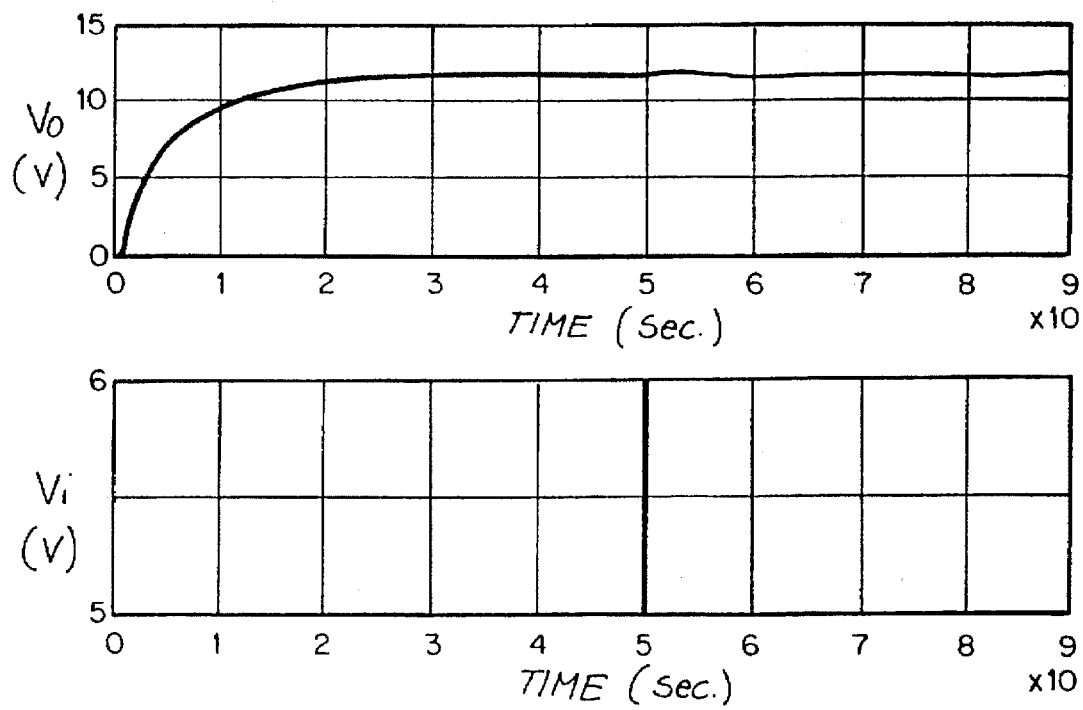

FIG. 13e plots the variation of the output voltage $V_o$ and of the input voltage $V_i$ in time.

Figure 13F:
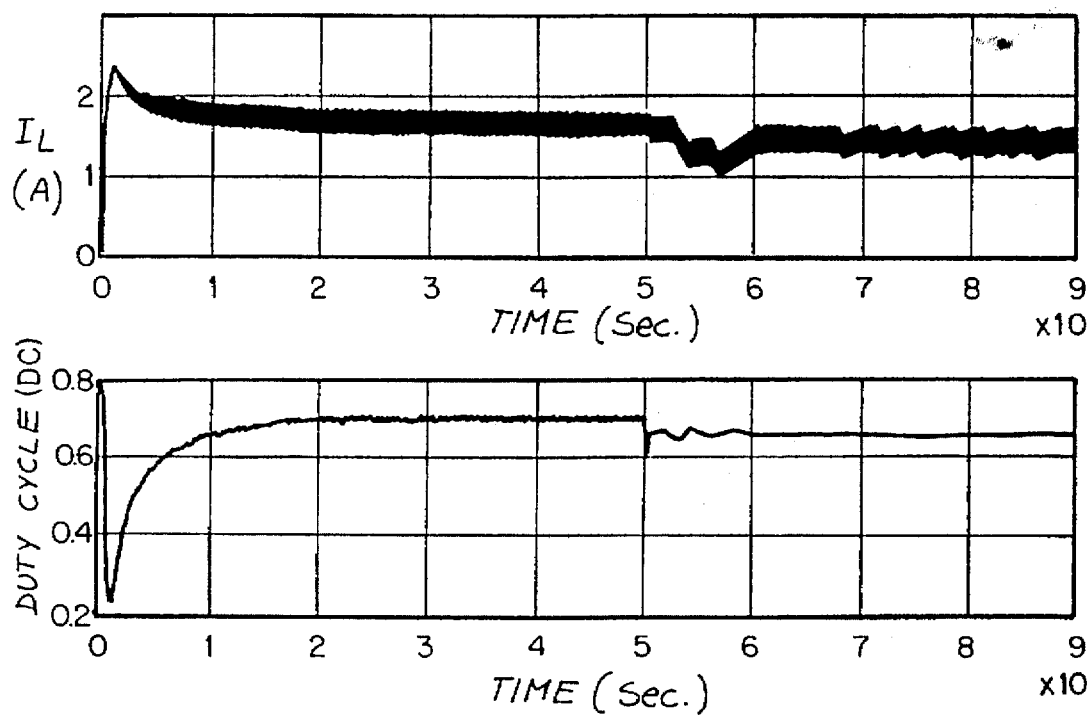

FIG. 13f plots the variation of the current $I_L$ and of the duty cycle DC in time.

Results obtained with an input voltage $V_i$ equal to 5 and 24 Volts have been plotted. The error is always under 0.06 Volts, and the value of the current on the inductor $I_L$ is always below the maximum threshold value and never reaches 0 A (discontinuous mode). All the desired characteristics (gradual switch-on, protection against overloads and undercurrents, control target) have been achieved without using additional circuitry.

In all the cases considered, excellent performance has been obtained both as regards the control characteristic and as regards control robustness. On this subject, the controlled power supply is highly insensitive both to parametric variations and to variations of the input voltage $V_i$. It should be noted that the present fuzzy control process is capable not only of eliminating variations in the input voltage due to external noise, but also of controlling the power supply, fixing an output voltage that is equal to 12 V for an input voltage that can vary between 5 and 24 Volts. All the tests were conducted assuming a constant switching frequency of 80 kHz. It should therefore be noted that this type of control can be implemented with an analog fuzzy processor, in view of the high speed of these processors.

By using the process and the device according to the present invention it is possible to control the various operating conditions of the power supply without any additional circuitry. It is possible to measure short-circuit and open-circuit conditions and to control the entire system simply by considering appropriate membership functions for the current on the inductor $I_L$. In the same manner it is possible to drive the power transistor SW directly, and if high-power applications in which the transistor SW has a significant cost are considered, it is possible to directly monitor and control the relevant parameters of the switch SW, avoiding operation in critical conditions (high temperature, high collector currents, and high voltages simultaneously).

Furthermore, use of the process and device according to the present invention allows handling of information of different kinds in a highly compact manner. By virtue of this characteristic it is possible to simultaneously control both the output voltage $V_o$ and the current on the inductor L. It is furthermore possible to monitor and control the power transistor without any additional circuitry but simply by considering fuzzy rules with multiple consequents.

Finally, the present invention provides robust and fast control that can simultaneously handle information of different kinds ($V_i$, $V_o$, $I_L$).

The invention thus conceived is susceptible to numerous modifications and variations, all of which are within the scope of the inventive concept.

Thus, for example, the present invention can be applied to any one of the BUCK, BOOST and FLYBACK configurations of the switching power supply. It is furthermore possible to use other fuzzy inference and defuzzification methods.

Finally, all the details may be replaced with other technically equivalent ones.

In practice, the materials employed, as well as the shapes and dimensions, may be any according to the requirements without thereby abandoning the protective scope of the following claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A process for the fuzzy control of a switching power supply which has at least one inductor and at least one switching device, comprising the following steps:

measuring a value of a current in said inductor;

measuring a value of an input voltage of said switching power supply;

measuring an error generated between a reference voltage and an output voltage of said power supply;

defining fuzzy membership functions for said value of the current in said inductor, for said input voltage value and for said error;

defining an output membership function for a value of a duty cycle of said power supply;

defining multiple fuzzy inference rules to which said measured values and said membership functions are applied;

calculating corresponding weight functions of said membership functions; and defuzzifying results obtained by means of said weight function calculation and said application of fuzzy rules to obtain a real value of said duty cycle, which real value is for driving said switching device.

2. A process according to claim 1, wherein said process employs as said switching device a power transistor.

3. A process according to claim 2, further comprising the following steps:

measuring a value of a temperature of said power transistor; and defining a membership function for said temperature value.

4. A process according to claim 3, further comprising the step of defining a membership function for the value of at least one of a base current and a gate voltage of said power transistor; and wherein said defuzzification step generates a real value of said at least one of said base current and said gate voltage.

5. A process according to claim 4, wherein said process employs as said rules rules of an IF-THEN type, which rules define an antecedent and a consequent.

6. A process according to claim 5, wherein said defuzzification step comprises the calculation of centroids of the membership functions of said consequents.

7. A process according to claim 6, wherein said calculation of said weight functions occurs on said antecedents.

8. A process according to claim 5, wherein said calculation of said weight functions occurs on said antecedents.

9. A process according to claim 4, wherein said defuzzification step comprises the calculation of centroids of the membership functions of consequents.

10. A process according to claim 9, wherein said calculation of said weight functions occurs on antecedents.

11. A process according to claim 4, wherein said calculation of said weight functions occurs on antecedents.

12. A process according to claim 3, wherein said process employs as said rules rules of an IF-THEN type, which rules define an antecedent and a consequent.

13. A process according to claim 12, wherein said defuzzification step comprises the calculation of centroids of the membership functions of said consequents.

14. A process according to claim 13, wherein said calculation of said weight functions occurs on said antecedents.

15. A process according to claim 12, wherein said calculation of said weight functions occurs on said antecedents.

16. A process according to claim 3, wherein said defuzzification step comprises the calculation of centroids of the membership functions of consequents.

17. A process according to claim 16, wherein said calculation of said weight functions occurs on antecedents.

18. A process according to claim 3, wherein said calculation of said weight functions occurs on antecedents.

19. A process according to claim 2, further comprising the step of defining a membership function for the value of at least one of a base current and a gate voltage of said power transistor; and wherein said defuzzification step generates a real value of said at least one of said base current and said gate voltage.

20. A process according to claim 19, wherein said process employs as said rules rules of an IF-THEN type, which rules define an antecedent and a consequent.

21. A process according to claim 20, wherein said defuzzification step comprises the calculation of centroids of the membership functions of said consequents.

22. A process according to claim 21, wherein said calculation of said weight functions occurs on said antecedents.

23. A process according to claim 20, wherein said calculation of said weight functions occurs on said antecedents.

24. A process according to claim 19, wherein said defuzzification step comprises the calculation of centroids of the membership functions of consequents.

25. A process according to claim 24, wherein said calculation of said weight functions occurs on antecedents.

26. A process according to claim 19, wherein said calculation of said weight functions occurs on antecedents.

27. A process according to claim 2, wherein said process employs as said rules rules of an IF-THEN type, which rules define an antecedent and a consequent.

28. A process according to claim 27, wherein said defuzzification step comprises the calculation of centroids of the membership functions of said consequents.

29. A process according to claim 28, wherein said calculation of said weight functions occurs on said antecedents.

30. A process according to claim 27, wherein said calculation of said weight functions occurs on said antecedents.

31. A process according to claim 2, wherein said defuzzification step comprises the calculation of centroids of the membership functions of consequents.

32. A process according to claim 31, wherein said calculation of said weight functions occurs on antecedents.

33. A process according to claim 2, wherein said calculation of said weight functions occurs on antecedents.

34. A process according to claim 1, further comprising the following steps:

measuring a value of a temperature of said power transistor; and defining a membership function for said temperature value.

35. A process according to claim 34, further comprising the step of defining a membership function for the value of at least one of a base current and a gate voltage of said power transistor; and wherein said defuzzification step generates a real value of said at least one of said base current and said gate voltage.

36. A process according to claim 35, wherein said process employs as said rules rules of an IF-THEN type, which rules define an antecedent and a consequent.

37. A process according to claim 36, wherein said defuzzification step comprises the calculation of centroids of the membership functions of said consequents.

38. A process according to claim 37, wherein said calculation of said weight functions occurs on said antecedents.

39. A process according to claim 36, wherein said calculation of said weight functions occurs on said antecedents.

40. A process according to claim 35, wherein said defuzzification step comprises the calculation of centroids of the membership functions of consequents.

41. A process according to claim 40, wherein said calculation of said weight functions occurs on antecedents.

42. A process according to claim 35, wherein said calculation of said weight functions occurs on antecedents.

43. A process according to claim 34, wherein said process employs as said rules rules of an IF-THEN type, which rules define an antecedent and a consequent.

44. A process according to claim 43, wherein said defuzzification step comprises the calculation of centroids of the membership functions of said consequents.

45. A process according to claim 44, wherein said calculation of said weight functions occurs on said antecedents.

46. A process according to claim 43, wherein said calculation of said weight functions occurs on said antecedents.

47. A process according to claim 34, wherein said defuzzification step comprises the calculation of centroids of the membership functions of consequents.

48. A process according to claim 47, wherein said calculation of said weight functions occurs on antecedents.

49. A process according to claim 34, wherein said calculation of said weight functions occurs on antecedents.

50. A process according to claim 1, further comprising the step of defining a membership function for the value of at least one of a base current and a gate voltage of said switching device; and wherein said defuzzification step generates a real value of said at least one of said base current and said gate voltage.

51. A process according to claim 50, wherein said process employs as said rules rules of an IF-THEN type, which rules define an antecedent and a consequent.

52. A process according to claim 51, wherein said defuzzification step comprises the calculation of centroids of the membership functions of said consequents.

53. A process according to claim 52, wherein said calculation of said weight functions occurs on said antecedents.

54. A process according to claim 51, wherein said calculation of said weight functions occurs on said antecedents.

55. A process according to claim 50, wherein said defuzzification step comprises the calculation of centroids of the membership functions of consequents.

56. A process according to claim 55, wherein said calculation of said weight functions occurs on antecedents.

57. A process according to claim 50, wherein said calculation of said weight functions occurs on antecedents.

58. A process according to claim 1, wherein said process employs as said rules rules of an IF-THEN type, which rules define an antecedent and a consequent.

59. A process according to claim 58, wherein said defuzzification step comprises the calculation of centroids of the membership functions of said consequents.

60. A process according to claim 59, wherein said calculation of said weight functions occurs on said antecedents.

61. A process according to claim 58, wherein said calculation of said weight functions occurs on said antecedents.

62. A process according to claim 1, wherein said defuzzification step comprises the calculation of centroids of the membership functions of consequents.

63. A process according to claim 62, wherein said calculation of said weight functions occurs on antecedents.

64. A process according to claim 1, wherein said calculation of said weight functions occurs on antecedents.

65. A fuzzy control device for switching a power supply which has at least one inductor and at least one switching device comprising:
   means for measuring a value of a current in said inductor;
   means for measuring a value of an input voltage of said switching power supply;
   means for detecting an error generated between a reference voltage and an output voltage of said power supply;
   fuzzy inference means for applying said measured values and fuzzy membership functions for said current value on said inductor, for said input voltage value, for said error, and for a value of a duty cycle of said power supply, and
   to a plurality of fuzzy inference rules,
   means for calculating corresponding weight functions of said membership functions; and
   means for defuzzifying results obtained by said means for calculating and said means for applying, said means for defuzzifying being for producing a real value of said duty cycle for driving said switching device, and said means for defuzzifying being responsive to said means for calculating.

66. A device according to claim 65, wherein said switching device is a power transistor.

67. A device according to claim 66, further comprising means for measuring a value of a temperature of said power transistor; and wherein membership functions include a membership function for said temperature value.

68. A device according to claim 67, wherein:
   said membership functions include a membership function for the value of at least one of a base current and a gate voltage of said power transistor; and
   said defuzzification means are for generating a real value of said at least one of said base current and said gate voltage.

69. A device according to claim 68, wherein said fuzzy inference means are for applying said measured values and said membership functions to ones of said rules that are of an IF-THEN type and that define an antecedent and a consequent.

70. A device according to claim 69, wherein said defuzzification means are for calculating centroids of the membership functions of said consequents.

71. A device according to claim 70, wherein means for calculating performs said calculation of said weight functions on said antecedents.

72. A device according to claim 69, wherein means for calculating performs said calculation of said weight functions on said antecedents.

73. A device according to claim 68, wherein said defuzzification means are for calculating centroids of the membership functions of consequents.

74. A device according to claim 73, wherein means for calculating performs said calculation of said weight functions on antecedents.

75. A device according to claim 68, wherein means for calculating performs said calculation of said weight functions on antecedents.

76. A device according to claim 67, wherein said fuzzy inference means are for applying said measured values and said membership functions to ones of said rules that are of an IF-THEN type and that define an antecedent and a consequent.

77. A device according to claim 76, wherein said defuzzification means are for calculating centroids of the membership functions of said consequents.

78. A device according to claim 77, wherein means for calculating performs said calculation of said weight functions on said antecedents.

79. A device according to claim 76, wherein means for calculating performs said calculation of said weight functions on said antecedents.

80. A device according to claim 67, wherein said defuzzification means are for calculating centroids of the membership functions of consequents.

81. A device according to claim 80, wherein means for calculating performs said calculation of said weight functions on antecedents.

82. A device according to claim 67, wherein means for calculating performs said calculation of said weight functions on antecedents.

83. A device according to claim 66, wherein:
said membership functions include a membership function for the value of at least one of a base current and a gate voltage of said power transistor; and
said defuzzification means are for generating a real value of said at least one of said base current and said gate voltage.

84. A device according to claim 83, wherein said fuzzy inference means are for applying said measured values and said membership functions to ones of said rules that are of an IF-THEN type and that define an antecedent and a consequent.

85. A device according to claim 84, wherein said defuzzification means are for calculating centroids of the membership functions of said consequents.

86. A device according to claim 85, wherein means for calculating performs said calculation of said weight functions on said antecedents.

87. A device according to claim 84, wherein means for calculating performs said calculation of said weight functions on said antecedents.

88. A device according to claim 83, wherein said defuzzification means are for calculating centroids of the membership functions of consequents.

89. A device according to claim 88, wherein means for calculating performs said calculation of said weight functions on antecedents.

90. A device according to claim 83, wherein means for calculating performs said calculation of said weight functions on antecedents.

91. A device according to claim 66, wherein said fuzzy inference means are for applying said measured values and said membership functions to ones of said rules that are of an IF-THEN type and that define an antecedent and a consequent.

92. A device according to claim 91, wherein said defuzzification means are for calculating centroids of the membership functions of said consequents.

93. A device according to claim 92, wherein means for calculating performs said calculation of said weight functions on said antecedents.

94. A device according to claim 91, wherein means for calculating performs said calculation of said weight functions on said antecedents.

95. A device according to claim 66, wherein said defuzzification means are for calculating centroids of the membership functions of consequents.

96. A device according to claim 95, wherein means for calculating performs said calculation of said weight functions on antecedents.

97. A device according to claim 66, wherein means for calculating performs said calculation of said weight functions on antecedents.

98. A device according to claim 65, further comprising means for measuring a value of a temperature of said power transistor; and wherein membership functions include a membership function for said temperature value.

99. A device according to claim 89, wherein:
said membership functions include a membership function for the value of at least one of a base current and a gate voltage of said power transistor; and
said defuzzification means are for generating a real value of said at least one of said base current and said gate voltage.

100. A device according to claim 99, wherein said fuzzy inference means are for applying said measured values and said membership functions to ones of said rules that are of an IF-THEN type and that define an antecedent and a consequent.

101. A device according to claim 100, wherein said defuzzification means are for calculating centroids of the membership functions of said consequents.

102. A device according to claim 101, wherein means for calculating performs said calculation of said weight functions on said antecedents.

103. A device according to claim 100, wherein means for calculating performs said calculation of said weight functions on said antecedents.

104. A device according to claim 99, wherein said defuzzification means are for calculating centroids of the membership functions of consequents.

105. A device according to claim 104, wherein means for calculating performs said calculation of said weight functions on antecedents.

106. A device according to claim 99, wherein means for calculating performs said calculation of said weight functions on antecedents.

107. A device according to claim 98, wherein said fuzzy inference means are for applying said measured values and said membership functions to ones of said rules that are of an IF-THEN type and that define an antecedent and a consequent.

108. A device according to claim 107, wherein said defuzzification means are for calculating centroids of the membership functions of said consequents.

109. A device according to claim 108, wherein means for calculating performs said calculation of said weight functions on said antecedents.

110. A device according to claim 107, wherein means for calculating performs said calculation of said weight functions on said antecedents.

111. A device according to claim 98, wherein said defuzzification means are for calculating centroids of the membership functions of consequents.

112. A device according to claim 111, wherein means for calculating performs said calculation of said weight functions on antecedents.

113. A device according to claim 98, wherein means for calculating performs said calculation of said weight functions on antecedents.

114. A device according to claim 65, wherein:

said membership functions include a membership function for the value of at least one of a base current and a gate voltage of said switching device; and said defuzzification means are for generating a real value of said at least one of said base current and said gate voltage.

115. A device according to claim 114, wherein said fuzzy inference means are for applying said measured values and said membership functions to ones of said rules that are of an IF-THEN type and that define an antecedent and a consequent.

116. A device according to claim 115, wherein said defuzzification means are for calculating centroids of the membership functions of said consequents.

117. A device according to claim 116, wherein means for calculating performs said calculation of said weight functions on said antecedents.

118. A device according to claim 115, wherein means for calculating performs said calculation of said weight functions on said antecedents.

119. A device according to claim 114, wherein said defuzzification means are for calculating centroids of the membership functions of consequents.

120. A device according to claim 119, wherein means for calculating performs said calculation of said weight functions on antecedents.

121. A device according to claim 114, wherein means for calculating performs said calculation of said weight functions on antecedents.

122. A device according to claim 65, wherein said fuzzy inference means are for applying said measured values and said membership functions to ones of said rules that are of an IF-THEN type and that define an antecedent and a consequent.

123. A device according to claim 122, wherein said defuzzification means are for calculating centroids of the membership functions of said consequents.

124. A device according to claim 123, wherein means for calculating performs said calculation of said weight functions on said antecedents.

125. A device according to claim 122, wherein means for calculating performs said calculation of said weight functions on said antecedents.

126. A device according to claim 65, wherein said defuzzification means are for calculating centroids of the membership functions of consequents.

127. A device according to claim 126, wherein means for calculating performs said calculation of said weight functions on antecedents.

128. A device according to claim 65, wherein means for calculating performs said calculation of said weight functions on antecedents.

129. A process according to claim 1 wherein the process controls a DC/DC converter as said power supply.

130. A process according to claim 129 wherein the process controls a flyback DC/DC converter as said power supply.

131. A process according to claim 4 wherein the process controls a DC/DC converter as said power supply.

132. A process according to claim 131 wherein the process controls a flyback DC/DC converter as said power supply.

133. A fuzzy control device according to claim 65 wherein said power supply is a DC/DC converter.

134. A fuzzy control device according to claim 133 wherein the DC/DC converter is a flyback converter.

135. A fuzzy control device according to claim 68 wherein said power supply is a DC/DC converter.

136. A fuzzy control device according to claim 135 wherein the DC/DC converter is a flyback converter.

* * * * *

UNITED STATES PATENT AND TRADEMARK OFFICE

CERTIFICATE OF CORRECTION

PATENT NO. : 5,696,439

DATED : December 9, 1997

INVENTOR(S): Matteo LO PRESTI, Giuseppe D'ANGELO and Antonino CUCUCIO

It is certified that error appears in the above-identified patent and that said Letters Patent is hereby corrected as shown below:

On the title page:

United States Patent [19]
Lo Presti et al.

Signed and Sealed this

Twenty-fourth Day of February, 1998

Attest:

BRUCE LEHMAN

*Attesting Officer*  *Commissioner of Patents and Trademarks*